United States Patent [19]
Wyssmann

[11] Patent Number: 6,098,755
[45] Date of Patent: *Aug. 8, 2000

[54] BRUSHING DEVICE FOR LUBRICATING AND CLEANING GUIDE AND/OR DRIVE ELEMENTS

[76] Inventor: Max Wyssmann, Hochstr. 7, CH-3360, Herzogenbuchsee, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/924,024

[22] Filed: Aug. 29, 1997

[30] Foreign Application Priority Data

Mar. 9, 1996 [DE] Germany .............................. 196 35 728

[51] Int. Cl.⁷ ........................................................ F16H 7/12

[52] U.S. Cl. .......................................... 184/22; 184/15.1

[58] Field of Search ............................. 184/10, 15.1, 16, 184/19, 22, 102

[56] References Cited

U.S. PATENT DOCUMENTS

| 1,021,190 | 3/1912 | Hirz | 184/22 |
|---|---|---|---|
| 1,088,275 | 2/1914 | Hanson | 184/16 |
| 1,219,196 | 3/1917 | Timko' | 184/16 |
| 1,277,656 | 9/1918 | Smith | 184/16 |
| 1,367,211 | 2/1921 | Smith | 184/16 |
| 1,944,666 | 1/1934 | Osterberg | 184/22 |
| 2,571,320 | 10/1951 | Waters, Sr. | 118/226 |

*Primary Examiner*—David M. Fenstermacher
*Attorney, Agent, or Firm*—Schnader Harrison Segal & Lewis LLP

[57] ABSTRACT

A brushing device (1) for lubricating and cleaning guide and drive elements has a lubricant dispenser (2), a brush element (4) for applying the lubricant to the machine element, a delivery line device (3) connected to the lubricant dispenser for feeding lubricant to the brush element (4), where the delivery line device (3) is provided with a delivery line path (10) composed of an absorbent pad of a felt-like or fleece-like material.

22 Claims, 4 Drawing Sheets

BRUSHING DEVICE FOR LUBRICATING AND CLEANING GUIDE AND/OR DRIVE ELEMENTS

BACKGROUND OF THE INVENTION

1. Field of the Invention

The invention relates to a brushing device for lubricating and cleaning guide and/or drive elements, especially for lubricating and cleaning chains, rails, or cables.

2. Description of the Related Art

Devices for automatic lubrication of chains have been known for many years. An automatic grease dispenser (operating, e.g., on the basis of an electrochemical reaction) via an outflow safety device supplies lubricant continuously to a brush which passes it on to the chain being lubricated. In European Patent EP 0 599 087, a delivery device is positioned between the brush and the lubricant dispenser that has borings to the feed line of the lubricant (e.g., oil). The problem is that oil follows the path of least resistance. The oil therefore moves preferentially directly downward in the delivery device so that it is not assured that the different side regions and more remote places will be supplied uniformly with the desired quantity of lubricant for the machine element to be lubricated.

In addition, European Patent EP 0 599 087 describes an oil-delivery device that has the problem that the device is suitable essentially in each case for only one type of lubricant. Since borings of the same diameter in the case of a thinner, more fluid lubricant cannot also be used for a thicker, less fluid lubricant, it is necessary, according to European Patent EP 0 599 087, to modify the design of the delivery device at high cost so as to adapt it to the type of lubricant in each case.

SUMMARY OF THE INVENTION

The invention has the objective of devising a structurally simple brushing device for lubricating and cleaning guide and/or drive elements that assures, with a simple construction, continuous reliable and uniform lubrication and cleaning even under very rough conditions.

A brushing device according to the invention is provided with a brush element that has one or more rows of bristles that are adjacent to an absorbent pad of a felt-like or fleece-like material which defines a delivery line path or at least lie close to the absorbent pad of the delivery path at the times of relative movement between the brush and machine elements. The brush element receives lubricant from the absorbent pad and spreads the lubricant on the machine elements. At the same time, the rows of bristles clean the dirt off the machine elements.

The invention utilizes the effect of absorbing and passing on a liquid (here oil) well known for wicks or felts for a uniform and wide-area supply of lubricant to all of the bristles of a brush or even a system of brushes. For this specification, the term "felt threads" also refers to fleeces of various types. A single felt thread immersed in an oil container for supplying oil has the disadvantage of drawing the lubricant continuously and uncontrollably out of the oil container and supplying it to the machine element to be lubricated. Therefore, the machine element is "over-oiled" which, e.g., in the case of the guide rails of an elevator may cause the oil to run down the guide rails and soil the bottom of the elevator shaft.

The invention nullifies this effect through the selected combination of absorbent felt-like (or fleece-like) elements and adjacent rows of bristles collaborating with a connectable lubricant dispenser, because only a well-defined quantity of lubricant is supplied to the felts of the delivery line path. The use of a large-area delivery path compared to a thread has the additional advantage that the lubricant is supplied to every place in the element to be lubricated uniformly in a defined manner. Besides the lubrication function, the device according to the invention is constantly cleaning the machine element in an especially advantageous way.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
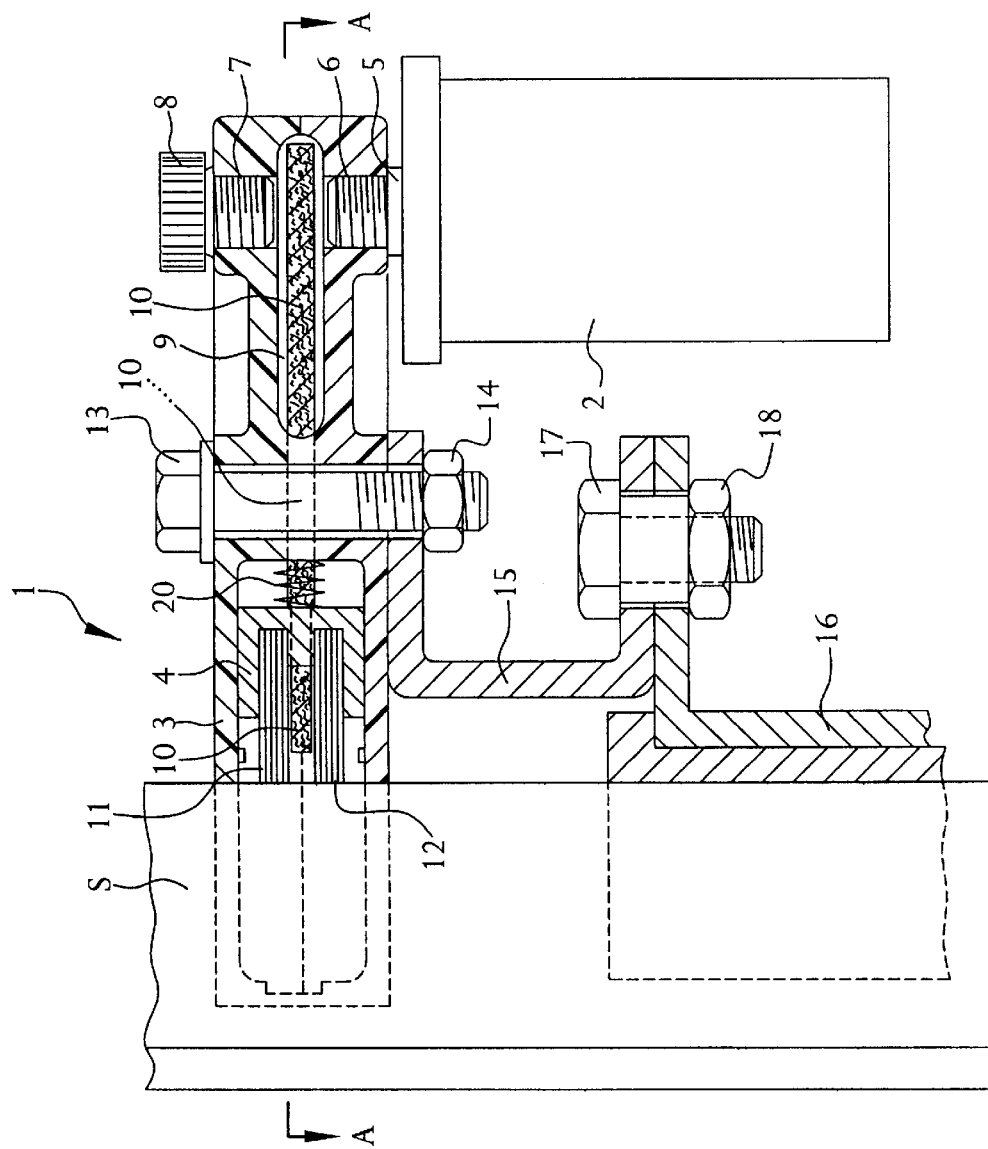
FIG. 1 is a partially cut-away side view of one embodiment of the invention.

FIG. 1 shows a brushing device 1 according to the invention for automatic lubrication and cleaning, especially of guiding and driving elements, here a guide rail S for elevators. The brushing device 1 has an automatic lubricant dispenser 2 which supplies lubricant through a delivery line device 3 (here, e.g., oil) to a brush element 4. The lubricant dispenser 2, e.g., is equipped with an automatic electrochemical gas pressure drive (not shown) which dispenses the supply of lubricant contained in the lubricant dispenser 2 adjustably over a definite time interval. The lubricant dispenser 2 has an outlet pipe connection 5 which is screwed into the threads 6 of a boring 7 in the housing of the delivery line device 3 which is made, e.g., of plastic.

A screw closure 8 for the free end of the boring 7 lying opposite the lubricant dispenser makes a visual inspection of the lubricant system possible. In addition by means of the screw closure 8 (or a stopper with integrated back-flow safety) the possibility exists of connecting a second lubricant dispenser, and it is possible feed oil into the delivery device at the time of its first use and to prime the absorbent delivery paths of the delivery device with oil.

The delivery line device 3 (with a housing of plastic or metal) has a hollow space 9 according to the type of a central system of a broad, flat opening into which one or more fleeces or felt sheets 10 are inserted for supplying lubricant. If the lubricant dispenser dispenses lubricant as a result of gas evolution, the latter is absorbed by the felt or fleece. In the case of continuous defined dispensing of lubricant, an absorbent pad defining the delivery line path 10 is permeated or impregnated with lubricant up to the brush element 4 so that the brush element 4 can brush lubricant over the machine element when moving relative to it. During periods of relative motion between the brush element 4 and the machine element, the bristles passing through the oil strip oil off the felt. Since the brush element 4 preferably has two rows of bristles 11, 12, slanted at an angle to the felt, even in the case of a change in the direction of motion, the optimal lubricant delivery line to the machine element is assured.

As also may be seen in FIG. 1, the absorbent pad delivery line path 10 extends out of the hollow space 9 up to between the individual rows of bristles 11, 12. The lubricating device 1 can be mounted on an elevator car or conveyor box (not shown) via a fixation means, here a bolt 13 with safety nut 14 and via two profiles 15, 16 screwed together (with bolt 17 and nut 18), so that it lubricates the rail S reliably and uniformly as it moves relative to the elevator car. The brush element 4 is inserted in a U-shaped opening 19 in the delivery line device 3, the length of the sides of the U corresponding to the dimensions of the brush element 4 and the ends of the brush rows 11, 12 being pressed against the rail by a spring element 20.

Figure 2:
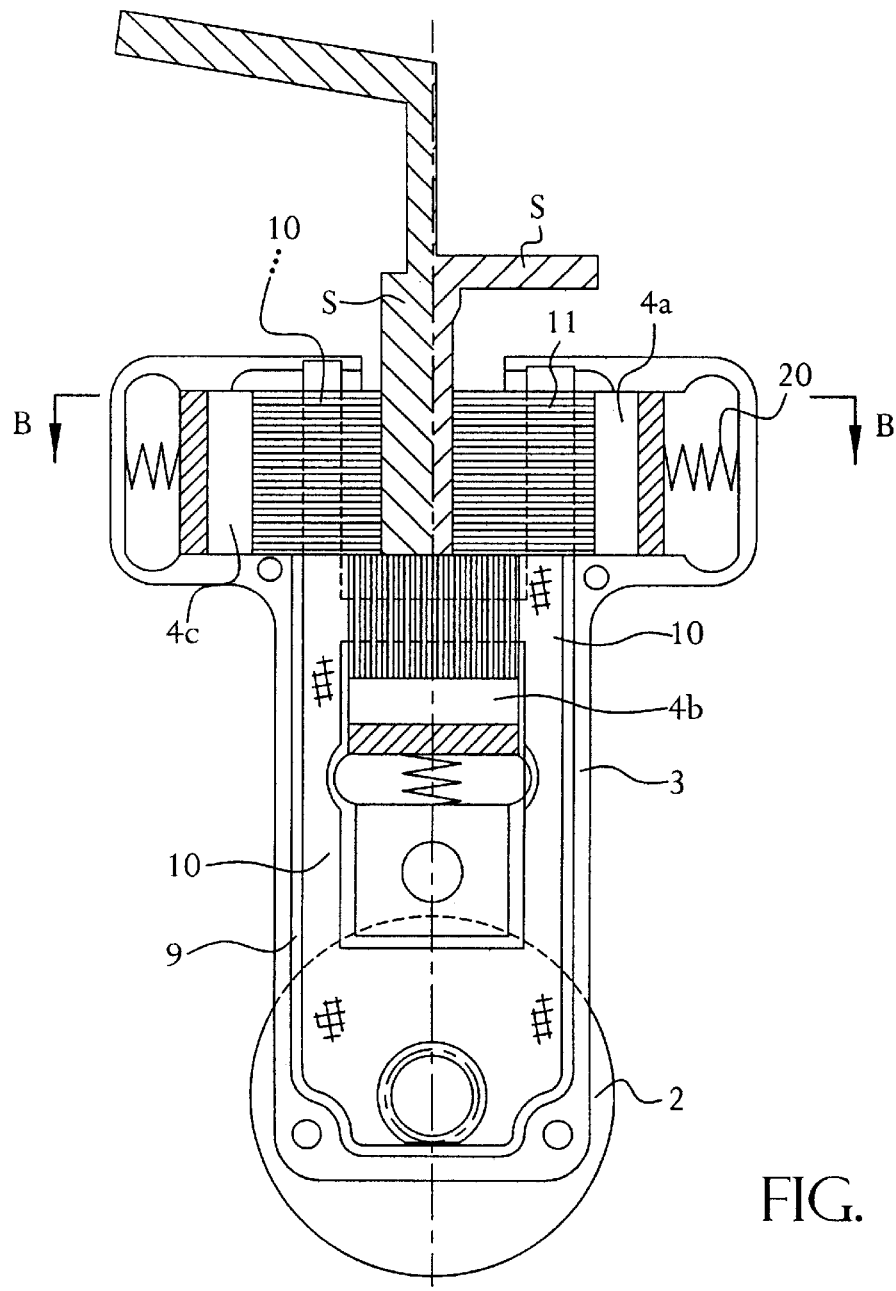
FIG. 2 is a plan, sectional view of the embodiment of FIG. 1 taken along line A—A.
Figure 3:
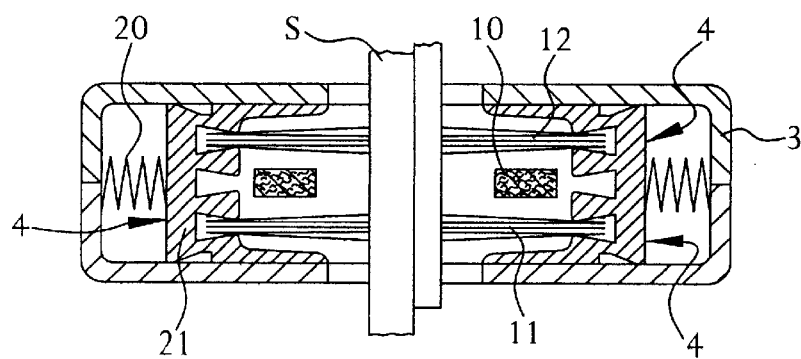
FIG. 3 is a sectional view taken along line B—B of FIG. 2.

As shown in FIGS. 2 and 3, the delivery line device is designed in such a way that it surrounds the rail S on several sides, with the brush elements 4a, 4b, 4c being assigned to three of the four sides of the rail and the absorbent pad 10 being divided into individual delivery line paths for supplying lubricant to each of the brush elements 4a, 4b, 4c. In this way, a multi-sided lubrication of the rail S to be oiled is assured in the simplest way, because the absorbent pad delivery path 10 supplies lubricant uniformly to each point of the brush elements 4a–c. The springs 20 assure that each brush element is pressed definitively against the rail S. In addition, the springs 20 assure that the brush device may be used for rails S of a great variety of thicknesses, because the springs always assure a well defined pressure of the brush elements against the rail S. See, e.g., FIG. 2 with two rails S). During conveying movements, the running rails of the elevator are enclosed, cleaned, and lubricated in a reliable, precisely defined manner.

Figure 4:
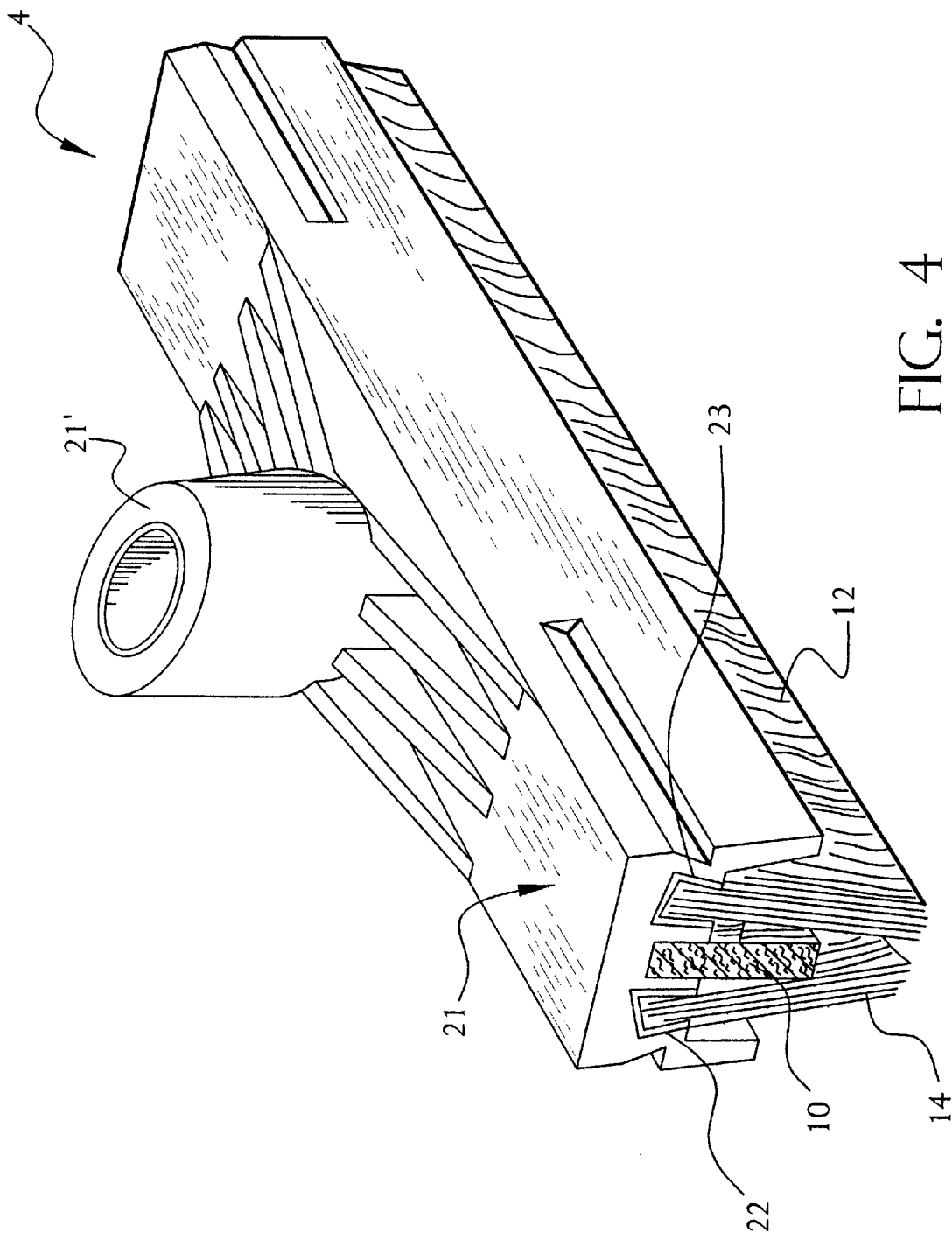
FIG. 4 is a schematic view of an alternative embodiment of the invention.

FIG. 4 illustrates the fact that the holder 21 of the brush element 4 is also designed essentially in the shape of a U (U profile) in which the rows of bristles are inserted into two grooves 22, 23 hollowed out of the holder. The rows of bristles are slightly slanted relative to each other in the grooves 22, 33 so that a close fit with the delivery line felt is assured and reliable lubrication takes place even when the direction of motion is changed.

Figure 5:
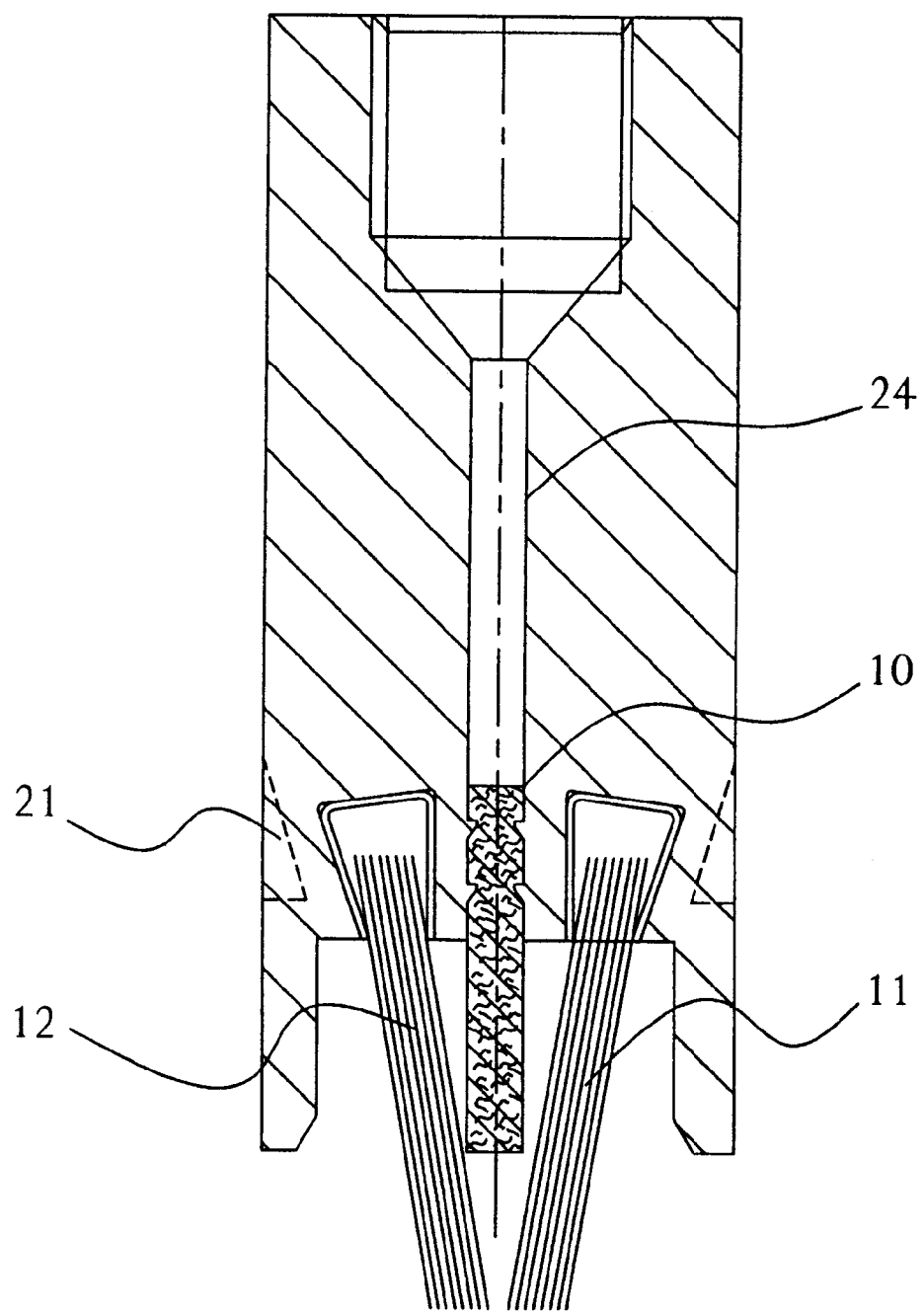
FIG. 5 shows another alternative embodiment of the invention—like FIG. 4—with a delivery line capillary system connected to it.

In addition to the cross-sectional geometry of the delivery line of the lubricant brushes shown in FIGS. 4 and 5, it is also possible, e.g., to make the lubricant brushes round (not shown). In this case, a central plug of felt-like or fleece-like material lies in the center surrounded by a row of bristles.

It is also advantageous for the delivery line device or the holder 21 to be designed in the manner shown in FIG. 4 or FIG. 5 as an integrated (or as a separate component) (pipe) attachment 21' with an inner delivery line 24 having capillary action by which the lubricant is guided to the absorbent pad delivery path 10. The capillary action has the advantage that the lubricant cannot run out uncontrollably from the dispenser 2 but emerges from the lubricant dispenser 2 only in the quantity assigned by the gas drive of the lubricant dispenser. A cut-open plug has proven effective as the sealing element for the lubricant dispenser 2 as is known in other fields, e.g., for detergent bottles.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A brushing device for lubricating and cleaning a machine element, comprising a brush element for applying the lubricant to the machine element said brushing device being fluidly connectable to a lubricant dispenser; wherein the brush element has two or more rows of bristles, wherein said absorbent pad passes between two of said two or more rows of bristles which are positioned for direct contact with said absorbent pad, wherein the absorbent pad defines a lubricant delivery line path extending between the two or more rows of bristles and the lubricant dispenser which supplies lubricant, wherein the brush element is adapted to receive the machine element in contact with the two or more rows of bristles; the lubricant is supplied from the lubricant dispenser to the rows of bristles via wicking action of the absorbent pad delivery line path; and the lubricant is applied to the machine element by the two or more rows of bristles during relative motion between the machine element and the brushing device.

2. The brushing device of claim 1, wherein a lubricant dispenser is provided with a plug that has a boring which is tightly closed at the end with a cap which is cut open before the lubricant dispenser is put into operation.

3. The brushing device of claim 1, wherein the rows of bristles are arranged in a holder.

4. The brushing device of claim 3, wherein the rows of bristles are slanted toward one another in the holder in such a way that they lie closely fitting against the absorbent pad.

5. The brushing device of claim 3, wherein the holder is designed as a U profile rail and the rows of bristles are arranged in two grooves hollowed out in the holder.

6. The brushing device of claim 3, wherein the holder has a pipe attachment with capillary action through which the lubricant can be guided to the delivery line path.

7. The brushing device of claim 1, further comprising a delivery line device connectable to the brush element for feeding the lubricant to the brush element and through which the delivery line path runs.

8. The brushing device of claim 7, wherein the delivery line device is designed as a plastic or metal housing that has at least one flat hollow space for introduction of the delivery line path.

9. The brushing device of claim 7, wherein housing of the delivery line device is adapted to surround the machine element to be lubricated on two or more sides, the brushing device having two or more brush elements, each being assigned to a different side of the machine element being lubricated, wherein the delivery line path is subdivided into individual paths to feed lubricant to each of the brush elements.

10. The brushing device of claim 7, further comprising an automatic lubricant dispenser adapted to be connected to housing of the delivery line device.

11. The brushing device of claim 7, wherein the delivery line device has a delivery line with capillary action.

12. The brushing device of claim 1, wherein the brushing device is adapted to be arranged on a machine so as to surround a stationary guide of on which the machine travels for lubricating and/or cleaning the guide as the brushing device moves relative to the stationary guide.

13. The brushing device of claim 12 wherein the machine, for which the device is adapted is an elevator.

14. The brushing device of claim 1, wherein the brush element is designed as a round brush with a circular row of bristles and felt plugs lying on the inside.

15. The brushing device of claim 1, wherein two rows of bristles are slanted towards one another to ensure contact with both the absorbent pad and a machine element positioned between the two rows of bristles.

16. The brushing device of claim 1, comprising two or more brush elements adapted to receive the lubricant from the lubricant dispenser, each brush element comprising two or more rows of bristles wherein the absorbent pad of the delivery line path passes between two of said two or more rows of bristles and each brush element being spring loaded to ensure independent contact with and lubrication and cleaning of a different side of the machine element during relative motion between the machine element and the brushing device.

17. The brushing device of claim 16, wherein there is uniform application of the lubricant across at least two or more of the brush elements.

18. The brushing device of claim 16, wherein the two or more brush elements are in planar alignment.

19. The brushing device of claim 1 wherein the absorbent pad is made of a felt material.

20. The brushing device of claim 1, wherein the lubricant is pressurized.

21. The brushing device of claim 1 wherein the absorbent pad is made of fleece material.

22. A brushing device for lubricating and cleaning an elevator element, comprising a brush element for applying the lubricant to the elevator element, said brushing device being fluidly connectable to a lubricant dispenser; wherein the brush element has two or more rows of bristles, wherein said absorbent pad passes between two of said two or more rows of bristles which are positioned for direct contact with said absorbent pad, wherein the absorbent pad defines a lubricant delivery line path extending between the two or more rows of bristles and the lubricant dispenser which supplies lubricant, wherein the brush element is adapted to receive the elevator element in contact with the two or more rows of bristles; the lubricant is supplied from the lubricant dispenser to the rows of bristles via wicking action of the absorbent pad delivery line path; and the lubricant is applied to the elevator element by the two or more rows of bristles during relative motion between the elevator element and the brushing device.

* * * * *